(12) United States Patent
Lyutskanov et al.

(10) Patent No.: US 10,773,603 B2
(45) Date of Patent: Sep. 15, 2020

(54) ELECTRIC VEHICLE WITH CHARGING CABLE RECOGNITION DEVICE

(71) Applicant: Bayerische Motoren Werke Aktiengesellschaft, Munich (DE)

(72) Inventors: Atanas Lyutskanov, Munich (DE); Andreas Pelger, Ismaning (DE); Tobias Schoellermann, Prien am Chiemsee (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/276,863

(22) Filed: Feb. 15, 2019

(65) Prior Publication Data

US 2019/0248250 A1 Aug. 15, 2019

Related U.S. Application Data

(63) Continuation of application No. PCT/EP2017/076857, filed on Oct. 20, 2017.

(30) Foreign Application Priority Data

Oct. 28, 2016 (DE) .................. 10 2016 221 350

(51) Int. Cl.
  *B60L 53/18* (2019.01)
  *B60L 53/14* (2019.01)
  (Continued)

(52) U.S. Cl.
  CPC ............ *B60L 53/18* (2019.02); *B60K 28/10* (2013.01); *B60L 53/14* (2019.02); *B60L 53/16* (2019.02);
  (Continued)

(58) Field of Classification Search
  CPC ..................................................... B60L 53/18
  (Continued)

(56) References Cited

U.S. PATENT DOCUMENTS 9,368,008 B2 * 6/2016 Jefferies ............ G08B 13/1418
2010/0271192 A1 * 10/2010 Mituta .................. B60Q 9/00
                                                            340/455

(Continued)

FOREIGN PATENT DOCUMENTS

DE          42 12 207 C2       2/1994
DE     10 2011 116 748 A1      5/2012
DE     10 2013 001 094 A1      7/2014

OTHER PUBLICATIONS

International Search Report (PCT/ISA/210) issued in PCT Application No. PCT/EP2017/076857 dated Jan. 15, 2018 with English translation (four (4) pages).
German-language Written Opinion (PCT/ISA/237) issued in PCT Application No. PCT/EP2017/076857 dated Jan. 15, 2018 (six (6) pages).

(Continued)

*Primary Examiner* — Jerry D Robbins
(74) *Attorney, Agent, or Firm* — Crowell & Moring LLP (57) ABSTRACT

A charging cable identification system is provided for a vehicle driven at least partially electrically, wherein the vehicle has an energy store that can be connected to an electrical energy source by a charging cable. The charging cable system has a control unit that is configured to enable or prevent the starting of the vehicle motor. The control unit is also configured to detect, prior to every event that is or can be predetermined, whether the charging cable is in the vehicle, and if the control unit detects that the charging cable is not in the vehicle, the control unit prevents the vehicle motor from starting.

15 Claims, 4 Drawing Sheets

(51) Int. Cl.
*H04W 4/80* (2018.01)
*B60L 53/60* (2019.01)
*B60L 53/16* (2019.01)
*B60K 28/10* (2006.01)
*H04W 12/06* (2009.01)
*B60K 28/00* (2006.01)

(52) U.S. Cl.
CPC ............... *B60L 53/60* (2019.02); *H04W 4/80* (2018.02); *H04W 12/06* (2013.01); *B60K 2028/003* (2013.01); *B60L 2250/16* (2013.01); *Y02T 10/7005* (2013.01); *Y02T 10/7088* (2013.01); *Y02T 90/121* (2013.01); *Y02T 90/14* (2013.01)

(58) Field of Classification Search
USPC ......................................................... 320/109
See application file for complete search history.

(56) References Cited

U.S. PATENT DOCUMENTS

| 2011/0191265 | A1* | 8/2011 | Lowenthal | B60L 3/12 705/412 |
| 2014/0236404 | A1* | 8/2014 | Liu | B60L 58/13 701/22 |
| 2015/0032312 | A1* | 1/2015 | Lambrinos | B60L 53/65 701/22 |
| 2015/0352970 | A1* | 12/2015 | Elias | B60W 50/14 701/22 |
| 2016/0311423 | A1* | 10/2016 | Storm | G06Q 50/30 |

OTHER PUBLICATIONS

German-language Search Report issued in counterpart German Application No. 102016221350.4 dated Aug. 25, 2017 with partial English translation (13 pages).

\* cited by examiner

ELECTRIC VEHICLE WITH CHARGING CABLE RECOGNITION DEVICE

CROSS REFERENCE TO RELATED APPLICATIONS

This application is a continuation of PCT International Application No. PCT/EP2017/076857, filed Oct. 20, 2017, which claims priority under 35 U.S.C. § 119 from German Patent Application No. 10 2016 221 350.4, filed Oct. 28, 2016, the entire disclosures of which are herein expressly incorporated by reference.

BACKGROUND AND SUMMARY OF THE INVENTION

The present invention relates to an at least partly electrically operated vehicle having a charging cable recognition device.

Electric vehicles, for example electrically operated two-wheeled vehicles and scooters, but in particular also electric cars having at least an assistive electric drive, are known. In this respect, micro, mild and fully hybrid vehicles are known that implement parallel, split-power, series hybrid drive concepts. In particular, plug-in hybrids are known, in which the electrical energy stores—as in the case of purely electric drive concepts—are able to be charged via the power grid. When the vehicle is at a standstill, the energy store may be connected to a public or private power grid by way of a charging cable and charged.

In many current electric vehicles (hereinafter also vehicle), the charging cable is accommodated loosely in the vehicle. In each charging procedure, the charging cable has to be removed from the vehicle and used to create a connection between the energy store of the electric vehicle and an energy source, for example a public or private charging station. In doing this, it is a frequent occurrence that the charging cable is left behind near or at the energy source after a charging procedure. In particular in the field of vehicle fleets and car sharing fleets, there is additionally the risk of the charging cable being forgotten unwittingly or through lack of attention. Intentionally leaving the charging cable behind, in the field of vehicle fleets and car sharing fleets, or intentionally removing the charging cable from the associated vehicle is also conceivable. Generally speaking, the loss of a charging cable only comes to light when it is intended to perform a new procedure of charging the energy store, which is not possible due to the missing charging cable. In the worst-case scenario, the driver of the vehicle may then not be able to travel any further on account of an accordingly empty energy store. He first of all has to find the charging cable again or sort out a replacement. From an operating point of view, this is uncomfortable and impairs the mobility of the driver of the vehicle.

The object of the invention is to avoid the abovementioned disadvantages and to provide a solution that in particular prevents forgetting or leaving behind or removal of the charging cable of an electric car after a charging procedure and possibly makes finding it again easier.

According to a first aspect of the invention, a charging cable recognition system for an at least partly electrically operated vehicle is provided. The vehicle comprises an energy store that is able to be connected to an electrical energy source by way of a charging cable. The charging cable recognition system comprises a control unit that is configured to allow starting of the engine of the vehicle or to prevent it. Additionally, the control unit is configured, upon each predetermined or predeterminable event, to detect whether the charging cable is situated in the vehicle. Upon detection that the charging cable is not situated in the vehicle, the control unit is configured to prevent starting of the engine of the vehicle.

The predetermined or predeterminable event may in this case be:
 activation of the engine;
 closure of the trunk or of the tailgate; and/or
 recognition of a finished procedure of charging (positive change in the state of charge, SOC) the energy store of the vehicle.

In other words, the control unit, upon or before each activation of the engine, for example every time starting of the engine of the vehicle is initiated (terminal 30 or radio terminal (15) on), is able to detect whether the charging cable is situated in the vehicle. In addition or as an alternative thereto, the control unit is able to detect, upon or after each closure of the trunk, whether the charging cable is situated in the vehicle. In addition or as an alternative thereto, the control unit, after recognition that a procedure of charging the energy store of the vehicle has finished, is able to recognize whether the charging cable is situated in the vehicle. It is obvious that any other suitable predetermined or predeterminable event may be selected, upon which the control unit is able to detect whether the charging cable is situated in the vehicle.

By way of example, a separate engine controller may be provided in the vehicle for controlling the starting of the engine or the activation of the engine of the vehicle. Any other arrangement of the engine controller, for example integration into a central controller that provides various functionalities, is also possible. The control unit may also be implemented by way of a (separate or combined) controller that is electrically connected to the engine controller.

By way of example, upon each predetermined or predeterminable event, for example upon each initiation of starting of the engine (that is to say immediately before activation of the engine) and/or after each closure of the trunk and/or after each recognition of a finished procedure of charging the energy store, the charging cable recognition may first of all be initiated by the control unit. The control unit may perform detection as to whether the charging cable is situated in the vehicle. If the detection is positive, the control unit may control the engine controller such that the engine of the vehicle is started. If it is detected by contrast that the charging cable is not situated in the vehicle, then the control unit may control the engine controller such that starting of the engine of the vehicle is prevented. Advantageously, this prevents the driver of the vehicle from being able to move the vehicle from the current location without the charging cable being situated in the vehicle.

Preferably, if the control unit detects that the charging cable is not situated in the vehicle, a corresponding message may be output to a user of the vehicle via an output unit.

In addition to preventing starting of the engine, the control unit may additionally control an output unit in the vehicle such that a corresponding message is output to the user of the vehicle. The message may contain an indication that starting of the engine was denied as the charging cable associated with the vehicle is not situated in the vehicle or is not situated at the intended location in the vehicle (for example charging cable receiver or charging cable holder). The output unit may be an output unit situated in the vehicle, for example an on-board computer that is able to be electrically connected to the control unit.

In addition or as an alternative thereto, the message (see above) may be output on a mobile terminal associated with the user of the vehicle, which terminal may be linked to the vehicle, for example. The link between the mobile terminal, for example a smartphone, and the vehicle may be a wired link (for example by way of a USB interface) to the vehicle electronics, but also a wireless link (for example Bluetooth, WLAN, mobile radio) to the vehicle electronics. In this case, a one-time registration of the mobile terminal with the vehicle or via a portal (for example a corresponding service via a server that provides the corresponding functionality) may be necessary.

It is thus made possible for the user of the vehicle to recognize that the charging cable is not situated in the vehicle or is not situated at the intended location in the vehicle. The user of the vehicle thus has the possibility of looking for the charging cable in situ and positioning it in the vehicle or at the intended location in the vehicle.

The user may optionally be given the possibility, in spite of the charging cable not being detected, of activating starting of the engine and thus starting the engine by way of a corresponding input via the input unit. This has the advantage that—if there is a defect or a problem for example in the charging cable recognition system such that the latter erroneously does not recognize the charging cable (that is to say the charging cable is in the vehicle but is not recognized), or if there is a defect such that for example the charging cable is no longer able to be mechanically released from the energy source, etc.—the user of the vehicle has the possibility of nevertheless activating starting of the engine and thus moving the vehicle. In this case, a corresponding message may be sent automatically to a back-end server of the vehicle manufacturer and/or of a fleet operator of the vehicle and/or to an operator of a charging column at which the last procedure of charging the energy store of the vehicle was detected. In this way, the user of the vehicle may also be given the possibility of intentionally not taking the charging cable with him. If the vehicle should recognize that the charging cable (or charging cables) is not situated in the vehicle, position data and/or past journey data of the user of the vehicle may be used to check whether one or more planned journeys are able to be covered, taking into account a current state of charge (SOC) of the energy store without additional charging thereof at an electrical energy source or power charging point. If the user of the vehicle has set a corresponding preset, in the case of a positive check (that is to say the one or more planned journeys are able to be covered without additional charging of the energy store), the output that the charging cable is not situated in the vehicle may be suppressed. In other words, the user may be given the possibility of not receiving a message regarding the absence of the charging cable in the vehicle, provided that one or more planned journeys are able to be traveled taking into account the current SOC.

In the event that the user starts the engine in spite of the charging cable not being detected, a last position of the vehicle at which the charging cable was detected may additionally be determined and output via the output unit in the vehicle and/or via the associated mobile terminal. By way of example, this last position of the vehicle may be determined by a global positioning system (GPS) receiver situated in the vehicle. In another example, a charging column or a position of the charging column at which a last charging procedure for charging the energy store of the vehicle was determined may be determined. In addition or as an alternative thereto, a first position of the vehicle in which the charging cable was not detected may be determined and output. In addition or as an alternative thereto, a position of the vehicle in which a last charging procedure for charging the energy store of the vehicle was detected may be determined and output. In this case, the automatic message to the back-end server of the vehicle manufacturer and/or of the fleet operator of the vehicle and/or the operator of the charging column may contain the determined position(s) of the vehicle or of the charging column. Advantageously, it is thus made possible for the user of the vehicle and/or the vehicle manufacturer and/or the fleet operator of the vehicle and/or the operator of the charging column to establish where the charging cable was last situated or where the charging cable was left behind, such that finding the charging cable again is made easier.

The charging cable recognition system preferably additionally comprises a charging cable receiver or charging cable holder for receiving the charging cable; and at least one sensing unit that is able to sense whether the charging cable is situated in or on the charging cable holder. In this case, the control unit is able to be electrically connected to the at least one sensing unit and is able to detect, with the aid of the at least one sensing unit, whether the charging cable is situated in the vehicle.

The at least one sensing unit preferably comprises a weight sensor that is able to sense a weight exerted on the charging cable holder by the charging cable, wherein the control unit is able to detect, by way of the weight exerted on the charging cable holder by the charging cable, whether the charging cable is situated in the vehicle.

The charging cable receiver or charging cable holder may be for example a cable reel in a receiving space. The cable reel may be accommodated in a side wall of the vehicle, for example in the trunk of the vehicle. In another example, the charging cable receiver may be a recess in the vehicle, for example in the trunk of the vehicle, in which the charging cable is able to be placed without there in this case being provision for the charging cable to be rolled up. In another example, the charging cable receiver may be a charging cable storage box. The charging cable receiver or charging cable holder additionally comprises a weight sensor that is able to be electrically connected to the control unit. The control unit, before each starting of the engine, is thus able to establish, by way of querying the weight of the charging cable holder, whether the charging cable is situated in the vehicle. By way of example, an exact weight of the charging cable may be stored in a storage unit accessible to the control unit. The charging cable, upon each predetermined or predeterminable event, for example upon each initiation of starting of the engine, may thus use the weight sensor to retrieve the current weight exerted on the charging cable receiver or charging cable holder and compare it with the weight stored in the storage unit. If the values match, then the control unit is able to detect that the charging cable is situated in the vehicle. If the values do not match, then the control unit is able to detect that the charging cable is not situated in the vehicle. In this case, the weight sensor should be installed on the charging cable receiver or charging cable holder such that the weight sensor is only able to detect the weight of the charging cable but not the weight of other potential objects situated in the vehicle.

Preferably, the at least one sensing unit comprises one or more of the following units:

a weight sensor that is able to sense a weight exerted on the charging cable holder by the charging cable;

a light barrier that is able to sense whether the charging cable is situated in the charging cable holder, and/or a socket in the vehicle to which the charging cable is able to be connected on the vehicle side in order to charge the energy store and that is able to recognize whether the charging cable is connected to the socket.

By way of example, the charging cable receiver may be a charging cable storage box. The charging cable storage box may comprise one or more of the following sensors or units:

a weight sensor that is able to sense a weight exerted on the charging cable holder by the charging cable;

a light barrier that is able to sense whether the charging cable is situated in the charging cable holder, and/or a socket in the vehicle to which the charging cable is able to be connected on the vehicle side in order to charge the energy store and that is able to recognize whether the charging cable is connected to the socket.

Each of the units may be connected in terms of communication, for example electrically, to the control unit. The control unit is able to detect, by way of the one or more units, whether the charging cable is situated in the vehicle.

The charging cable recognition system preferably comprises, in addition or as an alternative thereto, at least one reader (for example an evaluation unit) that is capable of reading or evaluating a transponder, for example RFID and/or NFC tags. The charging cable comprises a transponder, for example an RFID and/or NFC tag with a unique identifier. The unique identifier may be stored in a storage unit situated in the vehicle—for example ex works or via a service provider providing the corresponding functionality.

The control unit is preferably able to use the reader to detect whether the charging cable is situated in the vehicle.

The reader may be connected to the control unit. The control unit may additionally access the unique identifier of the RFID and/or NFC tags, which unique identifier is stored in the storage unit. The control unit is able to use the reader to detect whether the charging cable is situated in the vehicle. Advantageously, by using the reader and the unique identifier of the transponder, it is able to be established that the correct charging cable is situated in the vehicle.

Preferably, the RFID and/or NFC tag may be used:

to perform an authentication in order to activate the electrical energy source; and/or to pay for a procedure of charging the energy store using the electrical energy source.

In order to perform authentication for procedures of charging electrical energy stores at electrical energy sources and in order to pay for procedures of charging electrical energy stores at electrical energy sources (for example charging stations), access authorizations are generally granted by way of RFID and/or NFC tags, by way of which a payment procedure may also be performed. This access authorization (these access authorizations) may be integrated into the charging cable such that it (they) may be used for payment purposes after a charging procedure.

In one example, this may be the same RFID and/or NFC tag that is used to detect whether the charging cable is situated in the vehicle. Advantageously, the RFID and/or NFC tag may thus be used both to pay for the charging procedure and for the detection as to whether the charging cable (for example after the charging procedure) is situated in the vehicle.

In another example, this may be a separate RFID and/or NFC tag that is able to be installed on the charging cable.

Advantageously, the user of the vehicle therefore does not have to carry with him a separate card/chip for activation and for payment after a charging procedure at an electrical energy source.

By way of example, the RFID and/or NFC tag may be installed on the charging cable such that, upon connection of the electrical energy store to the electrical energy source, it is necessarily passed by a reader or an evaluation unit that is installed on the electrical energy source in order to activate the electrical energy source and for a payment procedure for a procedure of charging the energy store. By way of example, the reader or the evaluation unit may be installed on the electrical energy source in the immediate vicinity of a socket situated on the charging column, by way of which socket the electrical energy store is connected to the charging column (or electrical energy source) via the charging cable. Advantageously, the charging procedure at the electrical energy source is thus simplified for the user. In this case, the RFID and/or NFC tag may be installed such that it is covered for example by a covering mechanism such that it is not visible. In addition or as an alternative thereto, the RFID and/or NFC tag and/or the evaluation unit at the charging station may be modified such that communication between them is only possible for a predetermined or predeterminable time, for example 10 seconds or until connection of the electrical energy store to the electrical energy source, in order to avoid misuse (see below).

In another example, the RFID and/or NFC tag may be installed on the charging cable such that it is situated in the immediate vicinity of the socket in the vehicle, to which socket the charging cable is able to be connected on the vehicle side in order to charge the energy store (see above). During each payment procedure, the corresponding vehicle-side plug may for example be fixedly connected via the vehicle-side central locking system such that it is able to be unlocked only by the user of the vehicle. This has the advantage that misuse of the RFID and/or NFC tag by unauthorized third parties is able to be prevented. In particular, the corresponding charging column-side plug of the charging cable is often generally able to be unlocked by anyone after the charging procedure has finished so as to allow another procedure of charging another vehicle at the charging column. If the RFID and/or NFC tag is installed on the charging column-side plug, misuse thereof by third parties, for example for other unauthorized charging procedures, may be prevented. In another example, activation of charging at the charging column may also be performed by a vehicle key of the vehicle. By way of example, the vehicle key may comprise both a radio code and an RFID chip. The RFID chip may serve to release an immobilizer of the vehicle. This RFID chip could also serve to initiate activation of charging and/or a payment procedure at the charging column.

By way of example, the transponder may be installed on the charging cable such that said transponder destroys itself when it is forcibly removed. This has the advantage that misuse by a user (for example taking off the transponder and placing it in the vicinity of the reader and intentionally leaving the charging cable behind or removing it from the vehicle) is prevented.

By way of example, the control unit is able to control the reader upon each predetermined or predeterminable event (for example before each starting of the engine and/or after each closure of the trunk and/or after each recognition of a finished charging procedure) such that the reader is activated by the control unit so as for example to read RFID and/or NFC tags in the reception range of the reader. In particular, the reader, when reading RFID and/or NFC tags, may read at least one unique identifier thereof. After reading the unique identifier(s), the reader may send same to the control unit. The control unit may compare these with the unique identifier of the charging cable associated with the vehicle, which unique identifier is stored in the storage unit, and thus detect whether the charging cable is situated in the vehicle. Advantageously, it is thus able to be ensured that the charging cable is situated in the vehicle. The reader may be situated for example in the trunk of the vehicle at a predetermined or predeterminable location. By way of example, a recess may be provided in the trunk of the vehicle for storing the charging cable, at which recess the reader is situated.

Furthermore, it is possible to set a range of the reception range of the reader. By way of example, the reception range of the reader may be selected such that RFID and/or NFC tags are only read at a predefined region in the trunk of the vehicle. It is thus furthermore able to be ensured that the charging cable is situated in the reception range of the reader, that is to say for example at a location provided in the trunk for the charging cable. Advantageously, by setting the range of the reception range of the reader, it is able to be established unambiguously that the charging cable is situated in the vehicle itself and not in the immediate vicinity outside the vehicle.

In another example, an HF/LF (high-frequency/low-frequency) interface in the vehicle may be used to detect whether the charging cable is situated in the vehicle or outside the vehicle. The HF/LF interface is used in vehicles to detect whether the vehicle key is situated in the vehicle or outside the vehicle.

In one example, instead of RFID and/or NFC radio technology, as an alternative thereto, a Bluetooth radio method may be used between the charging cable and the vehicle using short-distance radio technology (Wireless Personal Area Network, WPAN).

According to a second aspect of the present invention, the underlying object is achieved by a method for recognizing a charging cable in an at least partly electrically driven vehicle, wherein the vehicle comprises an engine and an energy store that is able to be connected to an electrical energy source by way of a charging cable. The method comprises:

before each predetermined or predeterminable event:
detecting, by way of a control unit, whether the charging cable is situated in the vehicle; and if the charging cable is not situated in the vehicle:
preventing starting of the engine by way of the control unit.

According to a third aspect of the present invention, the underlying object is achieved by an at least partly electrically driven vehicle that comprises a charging cable recognition system according to embodiments of the invention.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
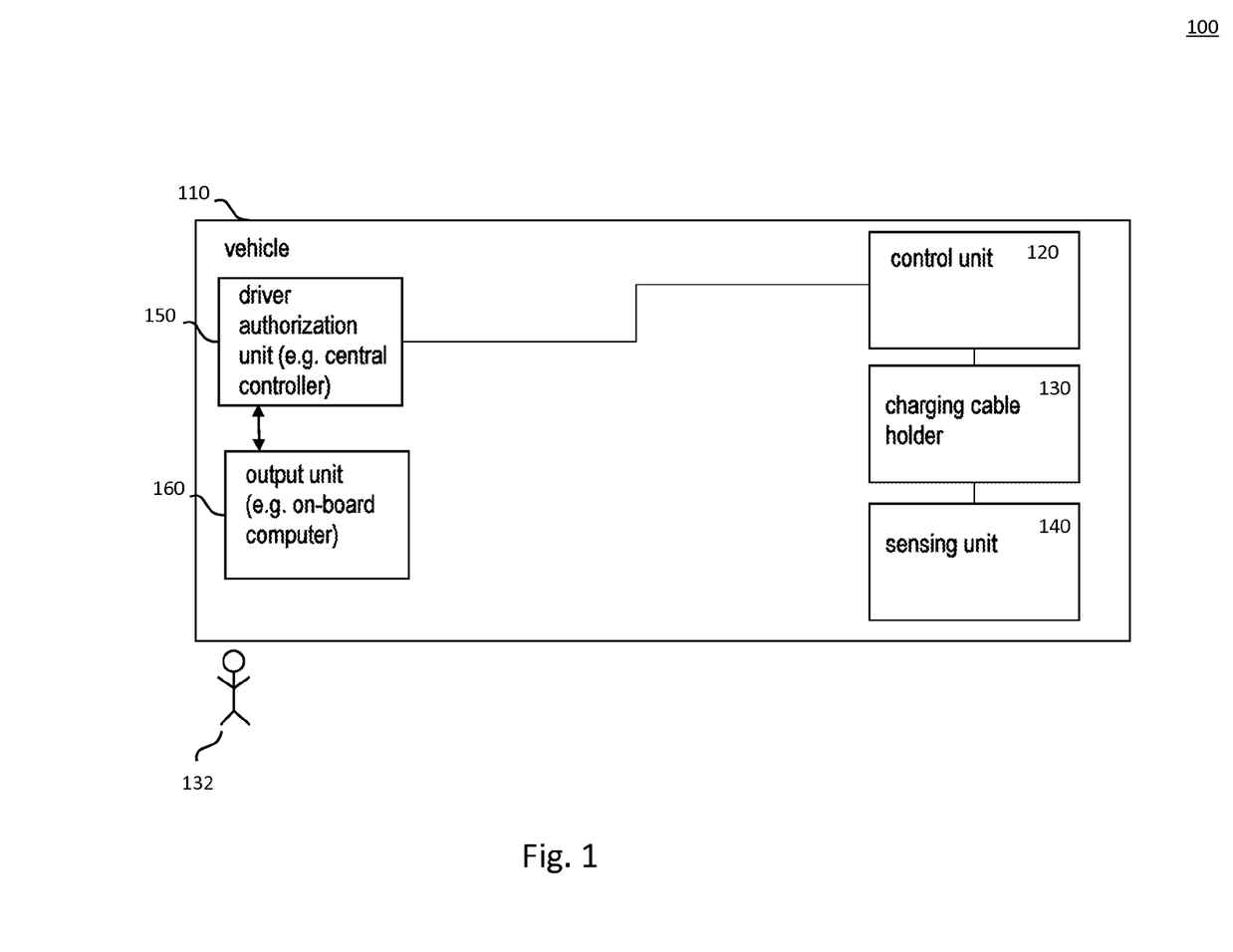
FIG. 1 is a schematic block diagram of an exemplary embodiment of the charging cable recognition system.

FIG. 1 shows an exemplary embodiment of the charging cable recognition system 100 for an at least partly electrically driven vehicle 110. The vehicle 110 comprises an energy store (not shown) that is able to be connected to an electrical energy source by way of a charging cable (not shown). The charging cable recognition system 100 comprises a control unit 120 that is configured to allow starting of the engine of the vehicle 110 or to prevent it. In addition, the control unit 120 is configured, before each predetermined or predeterminable event, to detect whether the charging cable is situated in the vehicle 110. Upon detection that the charging cable is not situated in the vehicle 110, the control unit 120 is configured to prevent starting of the engine of the vehicle 110.

The predetermined or predeterminable event may in this case be:
activation of the engine;
closure of the trunk of the vehicle 110; and/or
recognition of a finished procedure of charging the energy store of the vehicle 110.

In other words, the control unit, upon or before each activation of the engine, for example every time starting of the engine of the vehicle 110 is initiated (terminal 30 or radio terminal (15) on), is able to detect whether the charging cable is situated in the vehicle 110. In addition or as an alternative thereto, the control unit 120 is able to detect, upon or after each closure of the trunk of the vehicle 110, whether the charging cable is situated in the vehicle 110. In addition or as an alternative thereto, the control unit 120, after recognition of a finished procedure of charging the energy store of the vehicle 110, is able to recognize whether the charging cable is situated in the vehicle 110. It is obvious that any other suitable predetermined or predeterminable event may be selected, upon which the control unit 120 is able to detect whether the charging cable is situated in the vehicle 110.

By way of example, a separate engine controller may be provided in the vehicle 110 for controlling the starting of the engine or the activation of the engine of the vehicle 110. Any other arrangement of the engine controller, for example integration into a central controller that provides various functionalities, is also possible. The control unit 120 may also be implemented by way of a (separate or combined) controller (not shown) that is able to be electrically connected to the engine controller.

By way of example, upon each predetermined or predeterminable event (for example before each initiation of starting of the engine through actuation of a corresponding start-stop operator element in the vehicle by the driver 132 of the vehicle 110 and/or after each closure of the trunk of the vehicle 110 and/or after each recognized ended procedure of charging the energy store of the vehicle 110), the charging cable recognition may first of all be initiated by the control unit 120. The control unit 120 may perform detection as to whether the charging cable is situated in the vehicle. If the detection is positive, the control unit 120 may control the engine controller such that the engine of the vehicle 110 is started. If by contrast it is detected that the charging cable is not situated in the vehicle 110, the control unit 120 may then control the engine controller such that starting of the engine of the vehicle 120 is prevented. Advantageously, this prevents the driver 132 of the vehicle from being able to move the vehicle 110 from the current location without the charging cable being situated in the vehicle 110.

If the control unit 120 detects that the charging cable is not situated in the vehicle 110, a corresponding message may be output to a user 132 of the vehicle 110 via an output unit 160. The control unit 120 may thus additionally control an output unit 160 in the vehicle 110 such that the corresponding message is output to the user 132 of the vehicle 110. The message may contain an indication that starting of the engine was denied as the charging cable associated with the vehicle 110 is not situated in the vehicle 110 or is not situated at the intended location in the vehicle (for example charging cable receiver or charging cable holder 130). The output unit 160 may be an output unit 160 situated in the vehicle 110, for example an on-board computer that is able to be electrically connected to the control unit 120 (for example via an electric cable).

In addition or as an alternative thereto, the message (see above) may be output on a mobile terminal (not shown) associated with the user or driver 132 of the vehicle, which terminal may be linked to the vehicle 110, for example. The link between the mobile terminal, for example a smartphone, and the vehicle 110 may be a wired link (for example by way of a USB interface) to the vehicle electronics, but also a wireless link (for example Bluetooth, WLAN, mobile radio) to the vehicle electronics. In this case, a one-time registration of the mobile terminal with the vehicle 110 or via a portal (for example a corresponding service via a server that provides the corresponding functionality) may be necessary.

It is thus made possible for the user or driver 132 of the vehicle 110 to recognize that the charging cable is not situated in the vehicle 110 or is not situated at the intended location in the vehicle 110. The user 132 of the vehicle thus has the possibility of looking for the charging cable in situ and positioning it in the vehicle 110 or at the intended location in the vehicle 110.

The user 132 may optionally be given the possibility, in spite of the charging cable not being detected, of actuating an input via a corresponding input unit (for example input unit of the on-board computer, not shown) and thus starting the engine. This has the advantage that, if there is a defect for example in the charging cable recognition system 100 such that the latter erroneously does not recognize the charging cable (that is to say the charging cable is in the vehicle 100 but is not recognized), has the possibility of nevertheless activating starting of the engine and moving the vehicle 110. In this case, a corresponding message may be sent automatically to a back-end server of the vehicle manufacturer and/or of a fleet operator of the vehicle 110 and/or to an operator of a charging column at which the last procedure of charging the energy store of the vehicle 110 was detected. In this way, the user 132 of the vehicle 110 may also be given the possibility of intentionally not taking the charging cable with him.

In the event that the user 132 starts the engine in spite of the charging cable not being detected, a last position of the vehicle 110 at which the charging cable was detected may additionally be determined and output via the output unit 160 in the vehicle 110 and/or via the associated mobile terminal (not shown). By way of example, the last position of the vehicle 110 may be determined by a global positioning system (GPS) receiver situated in the vehicle 110. In another example, a charging column or a position of the charging column at which a last charging procedure for charging the energy store of the vehicle 110 was determined may be determined. In addition or as an alternative thereto, a first position of the vehicle 110 in which the charging cable was not detected may be determined and output. In addition or as an alternative thereto, a position of the vehicle 110 in which a last charging procedure for charging the energy store of the vehicle 110 was detected may be determined and output. In this case, the automatic message to the back-end server of the vehicle manufacturer and/or of the fleet operator of the vehicle 110 and/or the operator of the charging column may contain the determined position(s) of the vehicle 110. Advantageously, it is thus made possible for the user 132 of the vehicle 110 and/or the vehicle manufacturer and/or the fleet operator of the vehicle 110 and/or the operator of the charging column to establish where the charging cable was last situated or where the charging cable was left behind, such that finding the charging cable again is made easier.

If the vehicle 110 should recognize that the charging cable (or charging cables) is not situated in the vehicle 110, position data and/or past journey data of the user 132 of the vehicle 110 may be used to check whether one or more planned journeys are able to be covered, taking into account a current state of charge (SOC) of the energy store without additional charging thereof at an electrical energy source or power charging point. If the user 132 of the vehicle 110 has set a corresponding preset, in the case of a positive check (that is to say the one or more planned journeys are able to be covered without additional charging of the energy store), the output that the charging cable is not situated in the vehicle 110 may be suppressed. In other words, the user 132 may be given the possibility of not receiving a message regarding the absence of the charging cable in the vehicle 110, provided that one or more planned journeys are able to be traveled taking into account the current SOC.

The charging cable recognition system 100 may additionally comprise a charging cable receiver 130 or charging cable holder 130 for receiving the charging cable. In addition, the charging cable recognition system 100 may comprise a sensing unit 140 that is able to detect whether the charging cable is situated in the vehicle 110. The sensing unit 140 may comprise one or more of the following sensors and/or units: weight sensor, light barrier, socket in the vehicle 110 to which the charging cable is able to be connected on the vehicle side in order to charge the energy store, etc.

The weight sensor may for example sense a weight exerted on the charging cable receiver 130 or charging cable holder 130 by the charging cable. The control unit 120 is able to detect, by way of the weight exerted on the charging cable receiver 130 or charging cable holder 130, whether the charging cable is situated in the vehicle 110. The light barrier may for example detect whether the charging cable has been removed from the charging cable receiver 130 or has been placed in same and thus detect whether the charging cable is situated in the vehicle 110. The socket in the vehicle 110 may use for example corresponding sensors to detect whether the charging cable is connected to the socket and thus detect whether the charging cable is situated in the vehicle 110. The sensing unit 140 may comprise one or more of the abovementioned sensors or units in order to detect whether the charging cable is situated in the vehicle 110.

The charging cable receiver or charging cable holder 130 may be for example a charging cable storage box. The charging cable storage box may comprise one or more sensors and/or units to which the control unit is able to be connected. The sensors and/or units may—as already mentioned above—be: weight sensor, light barrier, socket in the vehicle to which the charging cable is able to be connected on the vehicle side in order to charge the energy store, etc.

The control unit is able to detect, by way of the one or more sensors or switches, whether the charging cable is situated in the vehicle.

In another example, the charging cable receiver or charging cable holder 130 may be a cable reel in a receiving space. The receiving space for the cable reel may be accommodated in a side wall of the vehicle 110, for example in the trunk of the vehicle 110. In another embodiment, the charging cable receiver 130 may be a recess in the vehicle 110, for example in the trunk of the vehicle 110, in which the charging cable is able to be placed without there in this case being provision for the charging cable to be rolled up. The charging cable receiver or charging cable holder 130 additionally comprises a weight sensor 140 that is able to be electrically connected to the control unit 120.

The control unit 120, before each predetermined or predeterminable event (for example upon each initiation of starting of the engine, after each closure of the trunk or of the tailgate and/or after each recognition of a finished procedure of charging the energy store of the vehicle 110) is thus able to establish, by way of querying the sensing unit 140, whether the charging cable is situated in the vehicle 110. By way of example, the sensing unit may comprise a weight sensor. In this example, querying the weight that is exerted (or not) on the charging cable receiver or charging cable holder 130 by the charging cable may establish whether the charging cable is situated in the vehicle 110. By way of example, an exact weight of the charging cable may be stored (for example ex works, but may also be performed manually via a service provider providing the corresponding functionality) in a storage unit (not shown) accessible to the control unit 120. The control unit 120, upon each initiation of starting of the engine, may thus use the weight sensor of the sensing unit 140 to sense the current weight exerted on the charging cable receiver or charging cable holder 130 and compare it with the weight stored in the storage unit. If the values match, then the control unit 120 detects that the charging cable is situated in the vehicle 110. If the values do not match, then the control unit 120 is able to detect that the charging cable is not situated in the vehicle 110. In this case, the weight sensor is installed on the charging cable receiver or charging cable holder such that the weight sensor is able to detect only the weight of the charging cable but not the weight of other potential objects situated in the vehicle.

Figure 2:
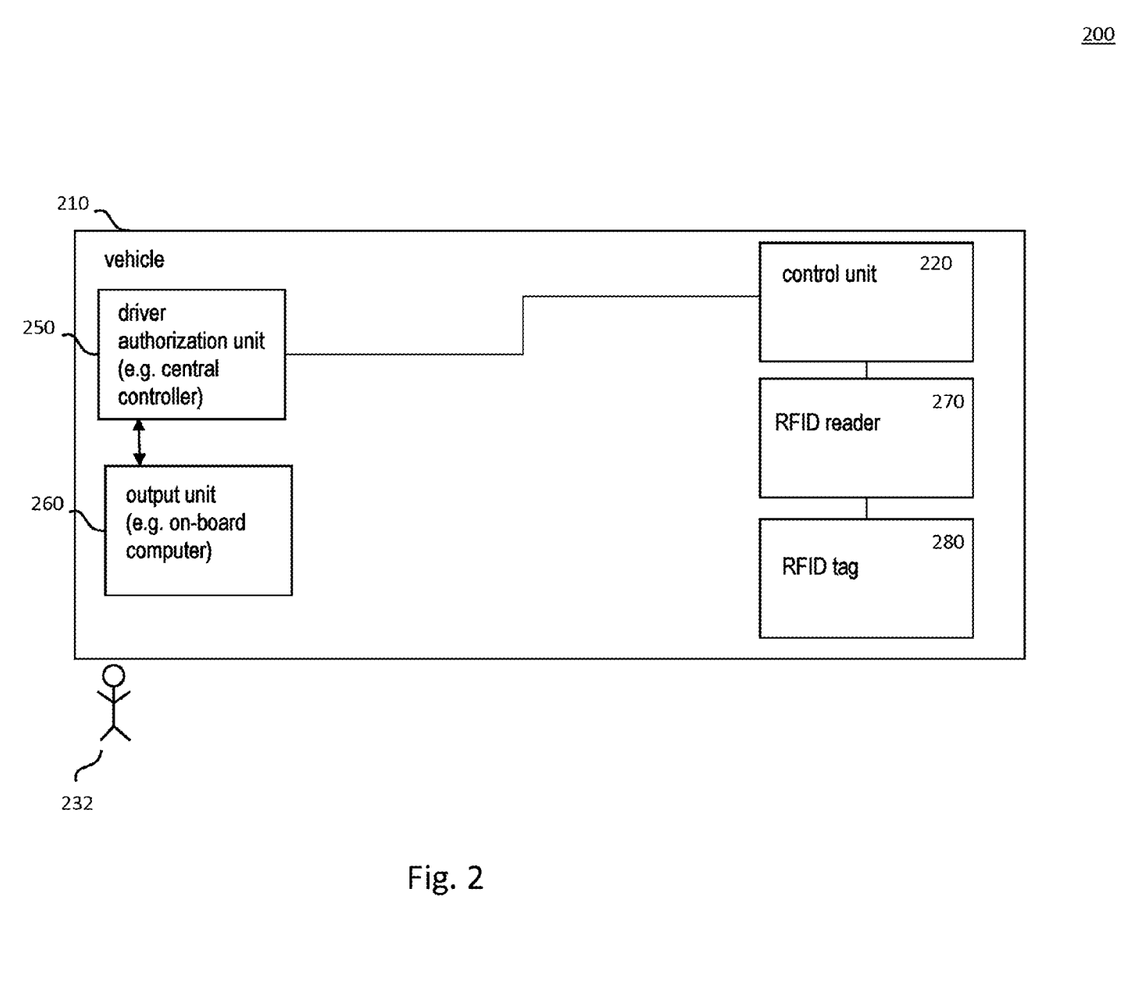
FIG. 2 is a schematic block diagram of an exemplary charging cable recognition system.

FIG. 2 shows another exemplary embodiment of the charging cable recognition system 200 for an at least partly electrically driven vehicle 210. The vehicle 210 comprises an energy store (not shown) that is able to be connected to an electrical energy source by way of a charging cable (not shown). The charging cable recognition system 200 comprises a control unit 220 that is configured to allow starting of the engine of the vehicle 210 or to prevent it. The control unit 220 is additionally configured, before each predetermined or predeterminable event, to detect whether the charging cable is situated in the vehicle 210. Upon detection that the charging cable is not situated in the vehicle 210, the control unit 220 is configured to prevent starting of the engine of the vehicle 210.

By way of example, a separate engine controller may be provided in the vehicle 210 for controlling starting of the engine or activation of the engine of the vehicle 210. Any other arrangement of the engine controller, for example integrated into a central controller that provides various functionalities, is also possible. The control unit 220 may also be implemented by way of a (separate or combined) controller (not shown) that is able to be electrically connected to the engine controller.

By way of example, upon each predetermined or predeterminable event (for example upon each initiation of starting of the engine through actuation of a corresponding start-stop operator element in the vehicle 210 by the driver 232 of the vehicle 210 and/or after each closure of the trunk and/or after each recognized ended procedure of charging the energy store of the vehicle 210), the charging cable recognition may first of all be initiated by the control unit 120. The control unit 220 may perform detection as to whether the charging cable is situated in the vehicle. If the detection is positive, the control unit 220 may control the engine controller such that the engine of the vehicle 210 is started. If by contrast it is detected that the charging cable is not situated in the vehicle 210, the control unit 220 may then control the engine controller such that starting of the engine of the vehicle 220 is prevented. Advantageously, this prevents the driver of the vehicle 232 from being able to move the vehicle 210 from the current location without the charging cable being situated in the vehicle 210.

If the control unit 220 detects that the charging cable is not situated in the vehicle 210, a corresponding message be output to a user 232 of the vehicle 210 via an output unit 260. In addition to preventing starting of the engine, the control unit 220 may additionally control an output unit 260 in the vehicle 210 such that a corresponding message is output to the user 232 of the vehicle 210. The message may contain an indication that starting of the engine was denied as the charging cable associated with the vehicle 210 is not situated in the vehicle 210 or is not situated at the intended location in the vehicle (for example charging cable receiver or charging cable holder 230). The output unit 260 may be an output unit 260 situated in the vehicle 210, for example an on-board computer that is able to be electrically connected to the control unit 220 (for example via an electric cable).

If the vehicle 210 should recognize that the charging cable (or charging cables) is not situated in the vehicle 210, position data and/or past journey data of the user 232 of the vehicle 210 may be used to check whether one or more planned journeys are able to be covered, taking into account a current state of charge (SOC) of the energy store without additional charging thereof at an electrical energy source or power charging point. If the user 232 of the vehicle 210 has set a corresponding preset, in the case of a positive check (that is to say the one or more planned journeys are able to be covered without additional charging of the energy store), the output that the charging cable is not situated in the vehicle 210 may be suppressed. In other words, the user 232 may be given the possibility of not receiving a message regarding the absence of the charging cable in the vehicle 210, provided that one or more planned journeys are able to be traveled taking into account the current SOC.

In addition or as an alternative thereto, the message (see above) may be output on a mobile terminal (not shown) associated with the user or driver 232 of the vehicle, which terminal may be linked for example to the vehicle 210. The link between the mobile terminal, for example a smartphone, and the vehicle 210 may be a wired link (for example by way of a USB interface) to the vehicle electronics, but also a wireless link (for example Bluetooth, WLAN, mobile radio) to the vehicle electronics. In this case, a one-time registration of the mobile terminal with the vehicle 210 or via a portal (for example a corresponding service via a server that provides the corresponding functionality) may be necessary.

It is thus made possible for the user or driver 232 of the vehicle 210 to recognize that the charging cable is not situated in the vehicle 210 or is not situated at the intended location in the vehicle 210. The user 232 of the vehicle thus has the possibility of looking for the charging cable in situ and positioning it in the vehicle 210 or at the intended location in the vehicle 210.

The user 232 may optionally be given the possibility, in spite of the charging cable not being detected, of activation via a corresponding input via an input unit (for example input unit of the on-board computer, not shown) and thus starting the engine. This has the advantage that, if there is a defect (for example in the charging cable recognition system 200 such that the latter erroneously does not recognize the charging cable, that is to say the charging cable is in the vehicle 210 but is not recognized), the user 232 has the possibility of nevertheless activating starting of the engine and moving the vehicle 210. In this case, a corresponding message may be sent automatically to a back-end server of the vehicle manufacturer and/or of a fleet operator of the vehicle 210 and/or to an operator of a charging column at which the last procedure of charging the energy store of the vehicle 210 was detected. In this way, the user 232 of the vehicle 210 may also be given the possibility of intentionally not taking the charging cable with him.

In the event that the user 232 starts the engine in spite of the charging cable not being detected, a last position of the vehicle 210 at which the charging cable was detected may additionally be determined and output via the output unit 260 in the vehicle 210 and/or via the associated mobile terminal. By way of example, the last position of the vehicle 210 may be determined by a global positioning system (GPS) receiver situated in the vehicle 210. In another example, a charging column or a position of the charging column at which a last charging procedure for charging the energy store of the vehicle 210 was determined may be determined. In addition or as an alternative thereto, a first position of the vehicle 210 in which the charging cable was not detected may be determined and output. In addition or as an alternative thereto, a position of the vehicle 210 in which a last charging procedure for charging the energy store of the vehicle 210 was detected may be determined and output. In this case, the automatic message to the back-end server of the vehicle manufacturer and/or of the fleet operator of the vehicle and/or the operator of the charging column may contain the determined position(s) of the vehicle. Advantageously, it is thus made possible for the user 232 of the vehicle 210 and/or the vehicle manufacturer and/or the fleet operator of the vehicle 210 and/or the operator of the charging column to establish where the charging cable was last situated or where the charging cable was left behind, such that finding the charging cable again is made easier.

The charging cable recognition system 200 may additionally comprise at least one reader (or evaluation unit) 270 that is capable of reading transponders, for example RFID and/or NFC tags. The reader 270 may be electrically connected to the control unit 220. At the same time, the charging cable may comprise a transponder, for example RFID and/or NFC tag 280, to which a unique identifier is assigned. The unique identifier may be stored in a storage unit situated in the vehicle 210—for example ex works or via a service provider providing the corresponding functionality—accessible to the control unit 220. The control unit 220 may use the reader 270 to detect whether the charging cable is situated in the vehicle 210. The use of the reader 270 and of the unique identifier of the transponder 280 additionally has the advantage that it is able to be established unambiguously that the correct charging cable associated with the vehicle 210 is situated in the vehicle 270.

The transponder, for example RFID and/or NFC tag 280, may be installed on the charging cable such that said transponder destroys itself when it is forcibly removed, so as advantageously to prevent misuse.

The control unit 220 may for example control the reader 270 such that—before each predetermined or predeterminable event, for example starting of the engine (that is to say when the driver 232 of the vehicle 210 starts the engine for example by actuating a corresponding start-stop operator element in the vehicle)—the reader 270 is activated by the control unit 220 so as to read RFID and/or NFC tags in the reception range of the reader 270. In particular, the reader 270, when reading RFID and/or NFC tags, may read at least one unique identifier thereof. After reading the unique identifier(s), the reader 270 may send same to the control unit 220. The control unit 220 may compare these with the unique identifier of the charging cable associated with the vehicle, which unique identifier is stored in the storage unit, and thus detect whether the charging cable is situated in the vehicle. As an alternative thereto, the reader 270 may perform the comparison between the read unique identifier(s) and the one stored in the storage unit and then send the result (match or no match) to the control unit 220. Advantageously, it is thus able to be ensured that the charging cable is situated in the vehicle 210. The reader 270 may be situated for example in the trunk of the vehicle 210 at a predetermined or predeterminable location. By way of example, a recess may be provided in the trunk of the vehicle 210 for storing the charging cable, at which recess the reader 270 is situated.

Furthermore, it is possible to set a range of the reception range of the reader 270. By way of example, the reception range of the reader 270 may be selected such that reading of RFID and/or NFC tags is only possible at a predefined region in the trunk of the vehicle 210. It is thus furthermore able to be ensured that the charging cable is situated in the reception range of the reader, that is to say for example at a space provided in the trunk for the charging cable (for example charging cable receiver 130, 330 or charging cable holder 130, 330). Advantageously, by appropriately setting the range of the reception range of the reader 270, it is additionally able to be established unambiguously that the charging cable is situated in the vehicle 210 itself and not in the immediate vicinity outside the vehicle 210.

The RFID and/or NFC tag, as an alternative thereto, may also be used to pay for a procedure of charging the energy store using the electrical energy source.

In order to pay for procedures of charging electrical energy stores at electrical energy sources (for example charging stations), access authorizations are generally granted by way of RFID and/or NFC tags, by way of which a payment procedure may also be performed. This access authorization may be integrated into the charging cable such that it may be used for payment purposes by the user 232 after a charging procedure.

In one example, this may be the same RFID and/or NFC tag 280 that is used to detect whether the charging cable is situated in the vehicle. This has the advantage that the RFID and/or NFC tag may be used both to pay for the charging procedure and for the detection as to whether the charging cable (for example after the charging procedure) is situated in the vehicle.

In another example, this may be a separate RFID and/or NFC tag that is able to be installed on the charging cable. This has the advantage that RFID and/or NFC tags that are granted subsequently in order to allow activation procedures and payment procedures at electrical energy sources or charging columns may also be used.

Advantageously, the user 232 of the vehicle 210 therefore does not have to carry with him a separate card for activation and for payment after a charging procedure at an electrical energy source.

By way of example, the RFID and/or NFC tag 280 may be installed on the charging cable such that, upon connection of the electrical energy store to the electrical energy source, it is necessarily passed by a reader or an evaluation unit that is installed on the electrical energy source in order to activate the electrical energy source and for a payment procedure for a procedure of charging the energy store. By way of example, the reader or the evaluation unit may be installed on the electrical energy source in the immediate vicinity of a socket situated on the charging column (or electrical energy source), by way of which socket the electrical energy store is connected to the charging column via the charging cable. This has the advantage that the charging procedure at the electrical energy source is simplified for the user 232. In this case, the RFID and/or NFC tag may be installed such that it is covered for example by a covering mechanism such that it is not visible. In addition or as an alternative thereto, the RFID and/or NFC tag and/or the evaluation unit at the charging station may be modified such that communication between both of them is only possible for a predetermined or predeterminable time, for example 10 seconds or until connection of the electrical energy store to the electrical energy source, in order to avoid misuse (see below).

In another example, the RFID and/or NFC tag may be installed on the charging cable such that said tag is installed in the immediate vicinity of the socket in the vehicle 210, to which socket the charging cable is able to be connected on the vehicle side in order to charge the energy store (see above). During each charging procedure, the corresponding vehicle-side plug may for example be fixedly connected to the vehicle-side socket via the vehicle-side central locking system such that it is able to be unlocked only by the user 232 of the vehicle 210. This has the advantage that misuse of the RFID and/or NFC tag by unauthorized third parties is able to be prevented. In particular, the corresponding charging column-side plug of the charging cable is often generally able to be unlocked by anyone after the charging procedure has finished so as to allow another procedure of charging another vehicle at the charging column. If the RFID and/or NFC tag is installed on the charging column-side plug, misuse thereof by third parties for other charging procedures may be prevented.

In another example, activation of charging at the charging column may also be performed by a vehicle key of the vehicle 210. By way of example, the vehicle key may comprise both a radio code and an RFID chip. The RFID chip may serve to release an immobilizer of the vehicle. This RFID chip could also serve to initiate activation of charging and/or a payment procedure at the charging column.

In another example, an HF/LF (high-frequency/low-frequency) interface in the vehicle 210 may be used to detect whether the charging cable is situated in the vehicle 210 or outside the vehicle 210. The HF/LF interface is used in vehicles to detect whether the vehicle key is situated in the vehicle 210 or outside the vehicle 210.

In one example, instead of RFID and/or NFC radio technology, as an alternative thereto, a Bluetooth radio method may be used between the charging cable and the vehicle using short-distance radio technology (Wireless Personal Area Network, WPAN).

Figure 3:
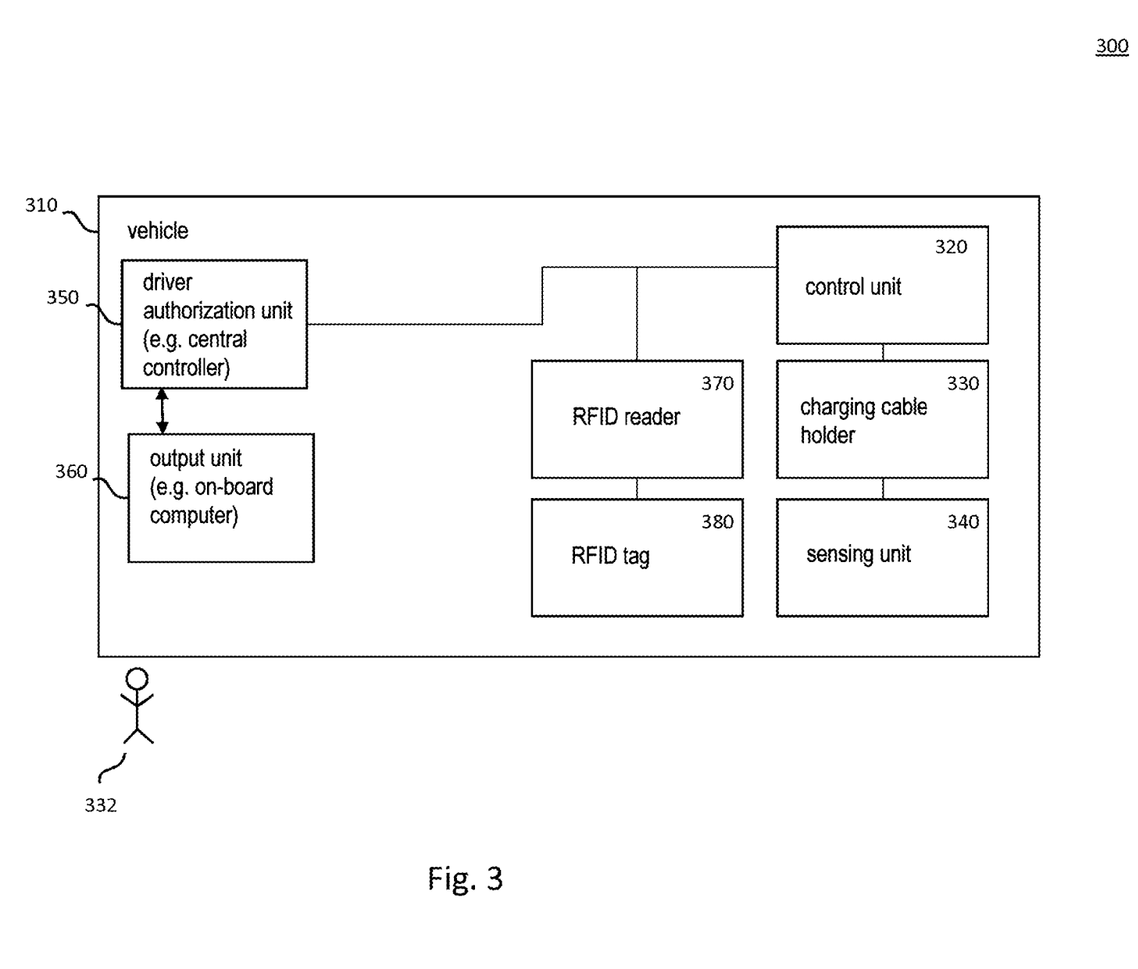
FIG. 3 is a schematic block diagram of an exemplary charging cable recognition system.

FIG. 3 shows another embodiment of the charging cable recognition system 300 for an at least partly electrically driven vehicle 310. This embodiment combines the embodiment as described with reference to FIGS. 1 and 2.

The vehicle 310 comprises an energy store (not shown) that is able to be connected to an electrical energy source by way of a charging cable (not shown). The charging cable recognition system 300 comprises a control unit 320 that is configured to allow starting of the engine of the vehicle 310 or to prevent it. Additionally, the control unit 320 is additionally configured, upon each predetermined or predetermined event (as described further above with reference to FIGS. 1 and 2), to detect whether the charging cable is situated in the vehicle 310. Upon detection that the charging cable is not situated in the vehicle 310, the control unit 320 is configured to prevent starting of the engine of the vehicle 310.

By way of example, a separate engine controller may be provided in the vehicle 310 for controlling the starting of the engine or the activation of the engine of the vehicle 310. Any other arrangement of the engine controller, for example integrated into a central controller that provides various functionalities, is also possible. The control unit 320 may also be implemented by way of a (separate or combined) controller (not shown) that is able to be electrically connected to the engine controller.

By way of example, upon each predetermined or predeterminable event (for example upon each initiation of starting of the engine through actuation of a corresponding start-stop operator element in the vehicle by the driver 332 of the vehicle 310), the charging cable recognition may first of all be initiated by the control unit 320. The control unit 320 may perform detection as to whether the charging cable is situated in the vehicle. If the detection is positive, the control unit 320 may control the engine controller such that the engine of the vehicle 310 is started. If by contrast it is detected that the charging cable is not situated in the vehicle 310, the control unit 320 may then control the engine controller such that starting of the engine of the vehicle 310 is prevented. Advantageously, this prevents the driver 332 of the vehicle from being able to move the vehicle 310 from the current location without the charging cable being situated in the vehicle 310.

The charging cable recognition system 300 may additionally comprise a charging cable receiver 330 or charging cable holder 330 for receiving the charging cable. In addition, the charging cable recognition system 300 may comprise a sensing unit 340 that is able to detect whether the charging cable is situated in the vehicle 310. The sensing unit 340 may comprise one or more of the following sensors and/or units: weight sensor, light barrier, socket in the vehicle 310 to which the charging cable is able to be connected on the vehicle side in order to charge the energy store, etc.

The weight sensor may for example sense a weight exerted on the charging cable receiver 330 or charging cable holder 330 by the charging cable. The control unit 320 is able to detect, by way of the weight exerted on the charging cable receiver 330 or charging cable holder 330, whether the charging cable is situated in the vehicle 310. The light barrier may for example detect whether the charging cable has been removed from the charging cable receiver 330 or has been placed in same and thus detect whether the charging cable is situated in the vehicle 310. The socket in the vehicle 310 may use for example corresponding sensors to detect whether the charging cable is connected to the socket and thus detect whether the charging cable is situated in the vehicle 310. The sensing unit 340 may comprise one or more of the abovementioned sensors or units in order to detect whether the charging cable is situated in the vehicle 310.

The charging cable receiver or charging cable holder 330 may be for example a charging cable storage box. The charging cable storage box may comprise one or more sensors and/or units to which the control unit is able to be connected. The sensors and/or units may—as already mentioned above—be: weight sensor, light barrier, socket in the vehicle to which the charging cable is able to be connected on the vehicle side in order to charge the energy store, etc. The control unit is able to detect, by way of the one or more sensors or switches, whether the charging cable is situated in the vehicle.

In another example, the charging cable receiver or charging cable holder 330 is a cable reel in a receiving space. The receiving space for the cable reel may be accommodated in a side wall of the vehicle 310, for example in the trunk of the vehicle 310. In another example, the charging cable receiver 330 may be a recess in the vehicle 310, for example in the trunk of the vehicle 310, in which the charging cable is able to be placed without there in this case being provision for the charging cable to be rolled up. The charging cable receiver or charging cable holder 330 additionally comprises a weight sensor 340 that is able to be electrically connected to the control unit 320.

The control unit 320, before each predetermined or predeterminable event (for example upon each initiation of starting of the engine, after each closure of the trunk or of the tailgate and/or after each recognition of a finished procedure of charging the energy store of the vehicle 310) is thus able to establish, by way of querying the sensing unit 340, whether the charging cable is situated in the vehicle 310. By way of example, the sensing unit may comprise a weight sensor. In this example, querying the weight that is exerted (or not) on the charging cable receiver or charging cable holder 330 by the charging cable may establish whether the charging cable is situated in the vehicle 310. By way of example, an exact weight of the charging cable may be stored (for example ex works, but may also be performed manually via a service provider providing the corresponding functionality) in a storage unit (not shown) accessible to the control unit 320. The control unit 320, upon each initiation of starting of the engine, may thus use the weight sensor of the sensing unit 340 to sense the current weight exerted on the charging cable receiver or charging cable holder 330 and compare it with the weight stored in the storage unit. If the values match, then the control unit 320 detects that the charging cable is situated in the vehicle 310. If the values do not match, then the control unit 320 is able to detect that the charging cable is not situated in the vehicle 310. In this case, the weight sensor is installed on the charging cable receiver or charging cable holder such that the weight sensor is able to detect only the weight of the charging cable, but not the weight of other potential objects situated in the vehicle.

If the control unit 320 detects that the charging cable is not situated in the vehicle 310, a corresponding message may be output to a user 332 of the vehicle 310 via an output unit 260. The control unit 320 may control an output unit 360 in the vehicle 310 such that a corresponding message is output to the user 332 of the vehicle 310. The message may contain an indication that starting of the engine was denied as the charging cable associated with the vehicle 310 is not situated in the vehicle 310 or is not situated at the intended location in the vehicle 310 (for example charging cable receiver or charging cable holder 330). The output unit 360 may be an output unit 360 situated in the vehicle 310, for example an on-board computer that is able to be electrically connected to the control unit 320 (for example via an electric cable).

In addition or as an alternative thereto, the message (see above) may be output on a mobile terminal (not shown) associated with the user or driver 332 of the vehicle 310, which terminal may be linked to the vehicle 310, for example. The link between the mobile terminal, for example a smartphone, and the vehicle 310 may be a wired link (for example by way of a USB interface) to the vehicle electronics, but also a wireless link (for example Bluetooth, WLAN, mobile radio) to the vehicle electronics. In this case, a one-time registration of the mobile terminal with the vehicle 310 or via a portal (for example a corresponding service via a server that provides the corresponding functionality) may be necessary.

It is thus made possible for the user or driver 332 of the vehicle 310 to recognize that the charging cable is not situated in the vehicle 310 or is not situated at the intended location in the vehicle 310. The user 332 thus has the possibility of looking for the charging cable in situ and positioning it in the vehicle 310 or at the intended location in the vehicle 310. The control unit thus has two possibilities for detecting whether the charging cable is situated in the vehicle 310.

The user 332 may optionally be given the possibility, in spite of the charging cable not being detected, of initiating activation of the engine through a corresponding input via an input unit (for example input unit of the on-board computer, not shown, or actuating the engine start button again) and thus starting the engine. This has the advantage that, if there is a defect (for example in the charging cable recognition system 300 such that the latter erroneously does not recognize the charging cable), the user 332 has the possibility of nevertheless activating starting of the engine and moving the vehicle 310. In this case, a corresponding message may be sent automatically to a back-end server of the vehicle manufacturer and/or of a fleet operator of the vehicle 310 and/or to an operator of a charging column at which the last procedure of charging the energy store of the vehicle 310 was detected. In this way, the user 332 of the vehicle 310 may also be given the possibility of intentionally not taking the charging cable with him.

If the vehicle 310 should recognize that the charging cable (or charging cables) is not situated in the vehicle 310, position data and/or past journey data of the user 332 of the vehicle 310 may be used to check, if there is a correspondingly previously stipulated setting by the user 332, whether one or more planned journeys are able to be covered, taking into account a current state of charge (SOC) of the energy store without additional charging thereof at an electrical energy source or power charging point. If the user 332 of the vehicle 310 has set a corresponding preset, in the case of a positive check (that is to say the one or more planned journeys are able to be covered without additional charging of the energy store), the output that the charging cable is not situated in the vehicle 310 may be suppressed. In other words, the user 332 may be given the possibility of not receiving a message regarding the absence of the charging cable in the vehicle 310, provided that one or more planned journeys are able to be traveled taking into account the current SOC.

In the event that the user 332 starts the engine in spite of the charging cable not being detected, a last position of the vehicle 310 at which the charging cable was detected may additionally be determined and output via the output unit 360 in the vehicle and/or via the associated mobile terminal. By way of example, the last position of the vehicle 310 may be determined by a global positioning system (GPS) receiver situated in the vehicle 310. In another example, a charging column or a position of the charging column at which a last charging procedure for charging the energy store of the vehicle 310 was determined may be determined. In addition or as an alternative thereto, a first position of the vehicle 310 in which the charging cable was not detected may be determined and output. In addition or as an alternative thereto, a position of the vehicle 310 in which a last charging procedure for charging the energy store of the vehicle was detected may be determined and output. In this case, the automatic message to the back-end server of the vehicle manufacturer and/or of the fleet operator of the vehicle 310 and/or the operator of the charging column may contain the determined position(s) of the vehicle 310. Advantageously, it is thus made possible for the user of the vehicle 310 and/or the vehicle manufacturer and/or the fleet operator of the vehicle 310 and/or the operator of the charging column to establish where the charging cable was last situated or where the charging cable was left behind, such that finding the charging cable again is made easier.

The charging cable recognition system 300 may additionally comprise at least one reader 370 that is capable of reading RFID and/or NFC tags. The reader 370 may be electrically connected to the control unit 320. At the same time, the charging cable may comprise an RFID and/or NFC tag 380, to which a unique identifier is assigned. The unique identifier may be stored in a storage unit situated in the vehicle—for example ex works or via a service provider providing the corresponding functionality—accessible to the control unit 320. The control unit 320 may use the reader 370 to detect whether the charging cable is situated in the vehicle 310. The use of the reader 370 and of the unique identifier of the transponder 380 has the advantage that it is able to be established unambiguously that the correct charging cable associated with the vehicle 310 is situated in the vehicle 310.

The control unit 320 may for example control the reader 370 such that, upon each predetermined or predeterminable event, the reader 370 is activated by the control unit 320 so as to read RFID and/or NFC tags in the reception range of the reader 370. In particular, the reader 370, when reading RFID and/or NFC tags, may read at least one unique identifier thereof. After reading the unique identifier(s), the reader 370 may send same to the control unit 320. The control unit 320 may compare these with the unique identifier of the charging cable associated with the vehicle 310, which unique identifier is stored in the storage unit, and thus detect whether the charging cable is situated in the vehicle. As an alternative thereto, the reader 370 may perform the comparison between the read unique identifier(s) and the one stored in the storage unit and then send the result (match or no match) to the control unit 320. Advantageously, it is thus able to be ensured that the charging cable is situated in the vehicle 310. The reader 370 may be situated for example in the trunk of the vehicle 320 at a predetermined or predeterminable location. By way of example, a recess may be provided in the trunk of the vehicle 320 for storing the charging cable, at which recess the reader 370 is situated.

Furthermore, it is possible to set a range of the reception range of the reader 370. By way of example, the reception range of the reader 370 may be selected such that reading of RFID and/or NFC tags is only possible at a predefined region in the trunk of the vehicle 310. It is thus furthermore able to be ensured that the charging cable is situated in the reception range of the reader, that is to say for example at a space provided in the trunk for the charging cable (for example charging cable receiver 130, 330 or charging cable holder 130, 330). Advantageously, by appropriately setting the range of the reception range of the reader 370, it is able to be established unambiguously that the charging cable is situated in the vehicle 310 itself and not for example in the immediate vicinity outside the vehicle 310.

The RFID and/or NFC tag, as an alternative thereto, may also be used to pay for a procedure of charging the energy store using the electrical energy source.

In order to pay for procedures of charging electrical energy stores at electrical energy sources (for example charging stations), access authorizations are generally granted by way of RFID and/or NFC tags, by way of which a payment procedure may also be performed. This access authorization may be integrated into the charging cable such that it may be used for payment purposes by the user 332 after a charging procedure.

In one example, this may be the same RFID and/or NFC tag 380 that is used to detect whether the charging cable is situated in the vehicle. This has the advantage that the RFID and/or NFC tag may be used both to pay for the charging procedure and for the detection as to whether the charging cable (for example after the charging procedure) is situated in the vehicle.

In another example, this may be a separate RFID and/or NFC tag that is able to be installed on the charging cable. This has the advantage that RFID and/or NFC tags that are granted subsequently in order to allow activation procedures and payment procedures at electrical energy sources or charging columns may also be used.

Advantageously, the user 332 of the vehicle 310 therefore does not have to carry with him a separate card for activation and for payment after a charging procedure at an electrical energy source.

By way of example, the RFID and/or NFC tag 380 may be installed on the charging cable such that, upon connection of the electrical energy store to the electrical energy source, it is necessarily passed by a reader or an evaluation unit that is installed on the electrical energy source in order to activate the electrical energy source and for a payment procedure for a procedure of charging the energy store. By way of example, the reader or the evaluation unit may be installed on the electrical energy source in the immediate vicinity of a socket situated on the charging column (or electrical energy source), by way of which socket the electrical energy store is connected to the charging column via the charging cable. This has the advantage that the charging procedure at the electrical energy source is simplified for the user 332. In this case, the RFID and/or NFC tag may be installed such that it is covered for example by a covering mechanism such that it is not visible. In addition or as an alternative thereto, the RFID and/or NFC tag and/or the evaluation unit at the charging station may be modified such that communication between both of them is only possible for a predetermined or predeterminable time, for example 10 seconds or until connection of the electrical energy store to the electrical energy source, in order to avoid misuse (see below).

In another example, the RFID and/or NFC tag may be installed on the charging cable such that said tag is installed in the immediate vicinity of the socket in the vehicle 310, to which socket the charging cable is able to be connected on the vehicle side in order to charge the energy store (see above). During each charging procedure, the corresponding vehicle-side plug may for example be fixedly connected to the vehicle-side socket via the vehicle-side central locking system such that it is able to be unlocked only by the user 332 of the vehicle 310. This has the advantage that misuse of the RFID and/or NFC tag by unauthorized third parties is able to be prevented. In particular, the corresponding charging column-side plug of the charging cable is often generally able to be unlocked by anyone after the charging procedure has finished so as to allow another charging procedure of another vehicle at the charging column. If the RFID and/or NFC tag is installed on the charging column-side plug, this could be misused by third parties for other charging procedures.

In another example, activation of charging at the charging column may also be performed by a vehicle key of the vehicle 310. By way of example, the vehicle key may comprise both a radio code and an RFID chip. The RFID chip may serve to release an immobilizer of the vehicle. This RFID chip could also serve to initiate activation of charging and/or a payment procedure at the charging column.

In another example, an HF/LF (high-frequency/low-frequency) interface in the vehicle 310 may be used to detect whether the charging cable is situated in the vehicle 310 or outside the vehicle 310. The HF/LF interface is used in vehicles to detect whether the vehicle key is situated in the vehicle 310 or outside the vehicle 310.

In one example, instead of RFID and/or NFC radio technology, as an alternative thereto, a Bluetooth radio method may be used between the charging cable and the vehicle 310 using short-distance radio technology (Wireless Personal Area Network, WPAN).

The charging cable detection possibilities described above may be performed one after another or in parallel in time. Providing two charging cable detection possibilities has the advantage that charging cable detection by the control unit is less susceptible to errors and an erroneously prevented starting of the engine of the vehicle 310 (for example through erroneous functioning of the reader 370 or of the weight sensor) is thus minimized.

In addition or as an alternative thereto, with an enhanced charging cable detection possibility, in particular with an enhancement of RFID and/or NFC radio technology, it is also able to be detected and displayed where the charging cable is situated in the vehicle 310 if it is not situated at the intended location in the vehicle. Advantageously, the user 332 of the vehicle 310 can thus be spared from a lengthy search for the charging cable in the vehicle (for example storage box, trunk, passenger compartment, etc.). This may be implemented for example by a plurality of RFID and/or NFC readers 370 being installed in suitable installation spaces (storage box, trunk, passenger compartment) in the vehicle 310 in order thus to be able to detect where the charging cable is situated.

Figure 4A:
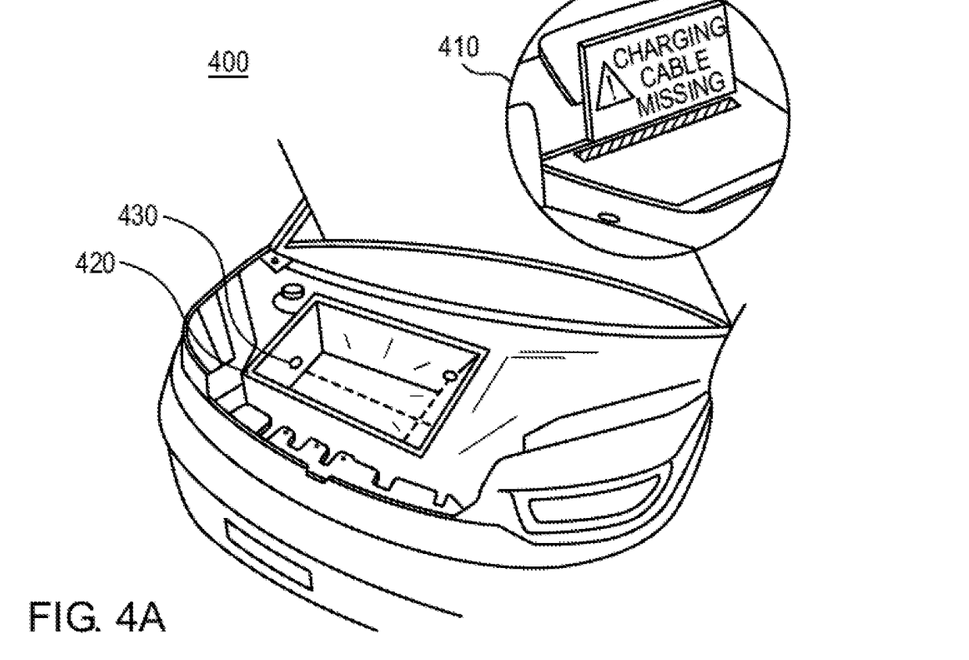
FIG. 4A shows an exemplary charging cable recognition system that detects a missing charging cable.

FIG. 4A shows an exemplary charging cable recognition system 400 that detects that the charging cable is missing. In this example, the charging cable recognition system comprises a charging cable receiver or charging cable holder 420 and a sensing unit 430. As already explained further above with reference to FIGS. 1 and 3, the sensing unit may comprise one or more sensors and/or units. The sensors and/or units may comprise for example: weight sensor, light barrier, socket, socket to which the charging cable is able to be connected on the vehicle side in order to charge the energy store and that is able to recognize whether the charging cable is connected to the socket. In this example, the charging cable recognition system (approach as described further above with reference to FIGS. 1 and 3) detects that the charging cable is not situated in the vehicle. Accordingly, in the output unit, an output 410 is output to the user of the vehicle that the charging cable is missing.

Figure 4B:
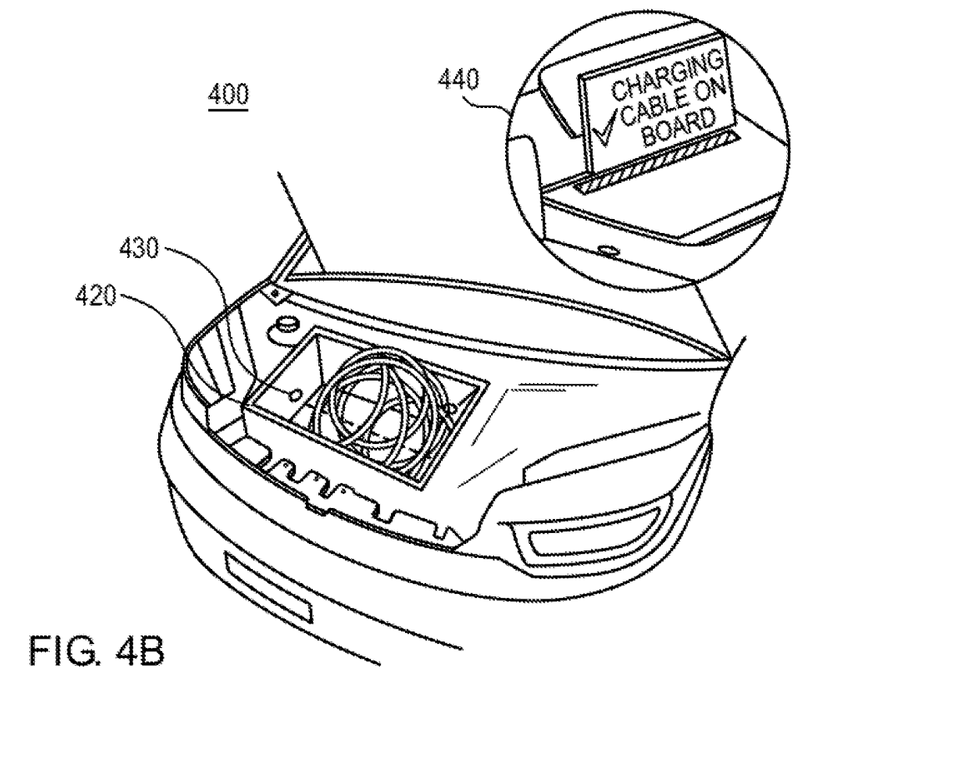
FIG. 4B shows an exemplary charging cable recognition system that detects the charging cable.

FIG. 4B shows the exemplary charging cable recognition system 400 that detects that the charging cable is situated in the vehicle. The detection takes place as described further above with reference to FIGS. 1 and 3. Accordingly, in the output unit, an output 440 is output to the user of the vehicle that the charging cable is situated in the vehicle (optional).

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A charging cable recognition system for an at least partly electrically operated vehicle, wherein the vehicle comprises an energy store that is able to be connected to an electrical energy source by way of a charging cable, comprising:
   a control unit that is configured to allow or prevent starting of an engine of the vehicle, wherein the control unit is additionally configured to:
      upon each predetermined or predeterminable event, to detect whether the charging cable is situated in the vehicle;
      upon detecting that the charging cable is not situated in the vehicle, prevent starting of the engine of the vehicle;
      determine, based on a state of charge of the energy store, that journey is able to be completed without using the charging cable; and
      suppress an output from being received based on the determination, wherein
         the output indicates the charging cable is not situated in the vehicle.

2. The charging cable recognition system as claimed in claim 1, wherein
   if the control unit detects that the charging cable is not situated in the vehicle, a corresponding message is output to a user of the vehicle via an output unit.

3. The charging cable recognition system as claimed in claim 1, further comprising:
   a charging cable receiver or charging cable holder for receiving the charging cable; and
   at least one sensing unit that is able to sense whether the charging cable is situated in or on the charging cable holder,
   wherein the control unit is able to be electrically connected to the at least one sensing unit and is able to detect, with the aid of the at least one sensing unit, whether the charging cable is situated in the vehicle.

4. The charging cable recognition system as claimed in claim 3, wherein
   the sensing unit is a weight sensor that is able to sense a weight exerted on the charging cable holder by the charging cable, and
   the control unit is able to use the weight exerted on the charging cable holder by the charging cable to detect whether the charging cable is situated in the vehicle.

5. The charging cable recognition system as claimed in claim 3, wherein
   the at least one sensing unit may comprise one or more of:
      a weight sensor that is able to sense a weight exerted on the charging cable holder by the charging cable;
      a light barrier that is able to sense whether the charging cable is situated in the charging cable holder, and a socket in the vehicle to which the charging cable is able to be connected on the vehicle side in order to charge the energy store and that is able to recognize whether the charging cable is connected to the socket; wherein the control unit is able to detect, with the aid of the one or more sensing units, whether the charging cable is situated in the vehicle.

6. The charging cable recognition system as claimed in claim 1, further comprising:
at least one reader that is capable of reading RFID and/or NFC tags,
wherein the charging cable comprises an RFID and/or NFC tag with a unique identifier.

7. The charging cable recognition system as claimed in claim 6, wherein
the control unit is able to use the reader to detect whether the charging cable is situated in the vehicle, and/or
the control unit is additionally able to use the reader to detect where the charging cable is situated in the vehicle.

8. The charging cable recognition system as claimed in claim 7, wherein
the RFID and/or NFC tag may be used:
to perform an authentication in order to activate the electrical energy source; and/or
to pay for a procedure of charging the energy store using the electrical energy source.

9. The charging cable recognition system as claimed in claim 6, wherein
the RFID and/or NFC tag may be used:
to perform an authentication in order to activate the electrical energy source; and/or
to pay for a procedure of charging the energy store using the electrical energy source.

10. An at least partly electrically operated vehicle comprising a charging cable recognition system as claimed in claim 1.

11. The charging cable recognition system as claimed in claim 1, wherein
the journey is a planned or past journey; and
the determination is based on one or more of:
a state of charge of the energy store; and
a current position of the vehicle.

12. The charging cable recognition system as claimed in claim 1, wherein
the control unit is additionally configured to:
allow, based on the determination that the journey is able to be completed without using the charging cable, starting of the engine of the vehicle.

13. The charging cable recognition system as claimed in claim 12, wherein
the journey is to a last position of the vehicle at which the charging cable was detected.

14. The charging cable recognition system as claimed in claim 12, wherein
the journey is to a last position of the electrical energy source at which the charging cable was detected.

15. A method for recognizing a charging cable in an at least partly electrically driven vehicle, wherein the vehicle comprises an energy store that is able to be connected to an electrical energy source by way of a charging cable, the method comprising the acts of:
before each predetermined or predeterminable event:
detecting, by way of a control unit, whether the charging cable is situated in the vehicle;
if the charging cable is not situated in the vehicle, preventing starting of the engine by way of the control unit;
determining, by way of the control unit and based on a state of charge of the energy store, that a journey is able to be completed without using the charging cable; and
suppressing an output from being receive based on the determination, wherein
the output indicates the charging cable is not situated in the vehicle.

* * * * *